United States Patent [19]
Harna et al.

[11] 3,732,355
[45] May 8, 1973

[54] INHIBITABLE RANDOM PULSE GENERATOR

[75] Inventors: Hyacint E. Harna, Cicero; Richard G. Merrell, Darien, both of Ill.

[73] Assignee: Zenith Radio Corporation, Chicago, Ill.

[22] Filed: Oct. 22, 1971

[21] Appl. No.: 191,670

[52] U.S. Cl. ........................178/5.1, 328/63, 331/78
[51] Int. Cl. ..........................H04n 1/44, H03b 29/00
[58] Field of Search .......................331/78; 307/217; 328/63; 178/5.1, 22; 325/122, 32

[56] References Cited

UNITED STATES PATENTS 3,614,316 10/1971 Andrews, Jr. et al...................325/34
3,538,242 11/1970 Hepner.................................178/5.1

*Primary Examiner*—Benjamin A. Borchelt
*Assistant Examiner*—S. C. Buczinski
*Attorney*—John J. Pederson and John H. Coult

[57] ABSTRACT

An inhibitable random pulse generator for use in a subscription television system or the like generates an output pulse indicative of a random one of a series of possible counting states, one or more of which may be inhibited to narrow selection to the remaining states. A counter included in the generator first has random noise applied to it for a predetermined period of time, leaving the counter in an unpredictable random counting state. Stepping pulses are then applied to step the counter to the first uninhibited state, at which time counting action ceases and a representative output pulse is developed. Provision is made for disabling the application of noise during the first predetermined period to obtain non-random operation of the counter for test purposes.

12 Claims, 3 Drawing Figures

INHIBITABLE RANDOM PULSE GENERATOR

BACKGROUND OF THE INVENTION

This application is directed to subscription television encoding systems, and more particularly to an improved inhibitable random pulse generator for use therein.

In a preferred subscription television system such as that described in detail in U.S. Pat. No. 3,244,806, issued Apr. 5, 1966 to George V. Morris and assigned to the present assignee, a transmitted video signal is protected against unauthorized reception by switching it between one operating mode, wherein the video signal is delayed, and another operating mode wherein it is translated without delay. The mode changes are made several times during each field in response to the amplitude variations of a rectangular-shaped switching signal developed in an encoder at the studio, giving the effect of a plurality of alternately displaced horizontal bands across the coded picture. As a further protection against unauthorized reception, the phase of the rectangular switching signal is varied randomly at random intervals, in response to a series of random-state control pulses from an inhibitable random pulse generator, giving a jittered effect to the picture as the alternately displaced bands vertically shift position in a random manner.

In order to decode this signal for application to a subscriber's television receiver, it is necessary to reconstruct within a decoder in the subscriber's home a rectangular switching signal in exact phase synchronism with its randomly varying parent at the studio. To this end, a series of synchronizing bursts are periodically transmitted in time coincidence with the random control pulses and at discrete frequencies representative of the state thereof. To maintain system security it is desirable that the number and frequencies of these synchronizing bursts be varied in a random manner and with redundancy, subject only to certain inhibitions recognizable in reconstructing the rectangular switching signal. These inhibitions are necessarily reflected in the generation of the control pulses, and it is to circuitry for generating the random control pulses with the necessary inhibitions that the present application is directed.

SUMMARY OF THE INVENTION

Accordingly, it is an object of the present invention to provide a new and improved inhibitable random pulse generator for use in a subscription television system or the like.

It is a more specific object of the invention to provide a new and improved random pulse generator which is less complicated and more economical to construct.

It is a still more specific object of the invention to provide a random pulse generator having a test mode wherein all possible outputs are generated in a re-occurring predictable sequence.

In accordance with the invention an inhibitable random pulse generator for use in a subscription television system or the like comprises an electric counter responsive to an applied signal for cyclically stepping through a series of predetermined counting states, a source of random noise pulses, means for applying the noise pulses to the counter for a predetermined period of time to step the counter to a random unpredictable one of the counting states, means for inhibiting selected ones of said states, a source of stepping pulses, and means for applying the stepping pulses to the counter to step the counter to the first non-inhibited one of the series of counting states.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings and in which:

DESCRIPTION OF THE PREFERRED EMBODIMENT

Before considering the inhibitable random pulse generator of the invention, it is desirable to have a general working knowledge of the video encoder portion of the system in which it is employed. To this end, a preferred encoder is depicted in block diagram form in FIG. 1.

Figure 1:
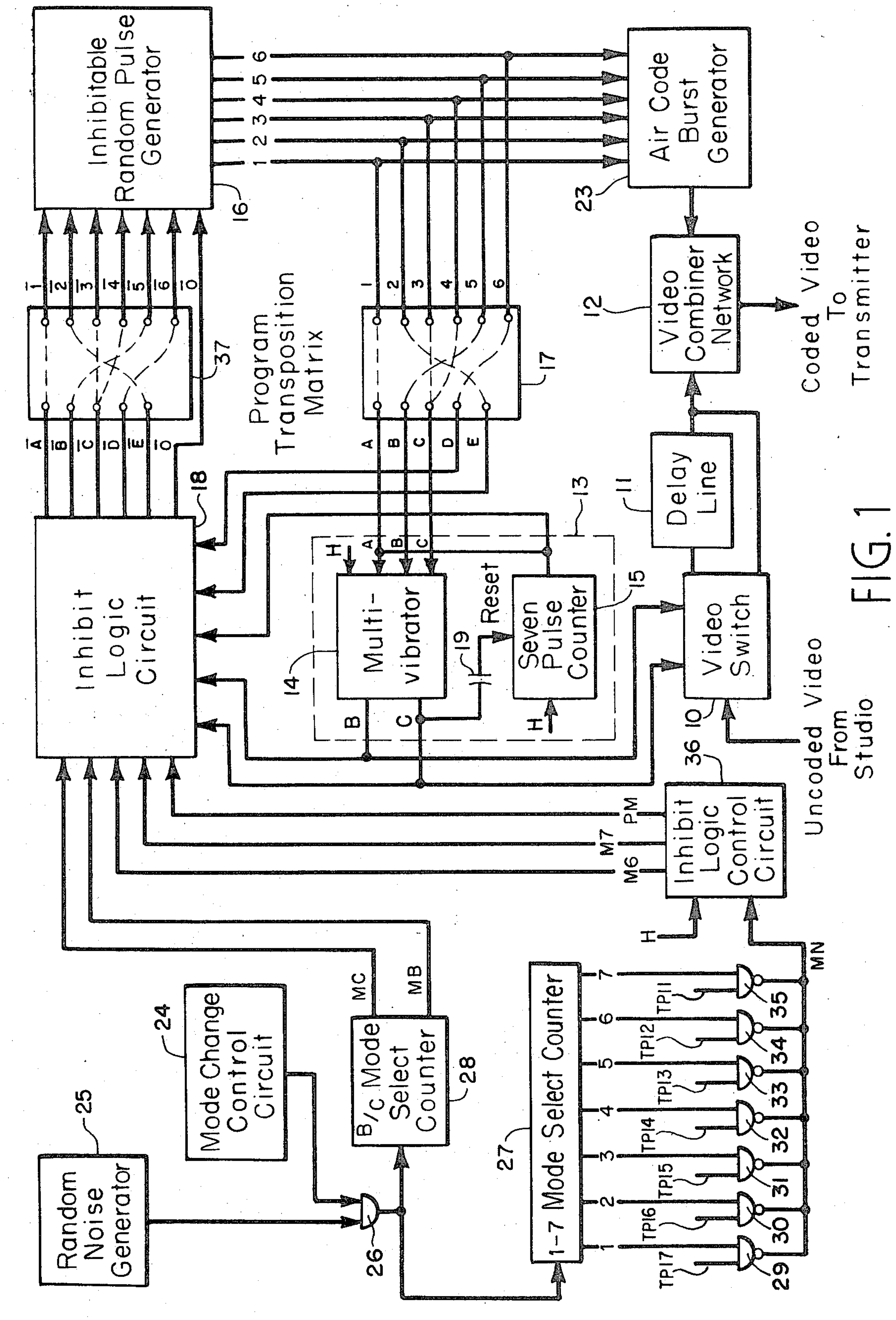
FIG. 1 is a block diagram of an encoder for a subscription television system embodying the present invention.

It will be recalled that prior to transmission in a preferred subscription television system the video signal is encoded by switching it alternately between delayed and undelayed modes several times during each field in response to a locally generated phase-varying rectangular switching signal. In the encoder of FIG. 1, encoding is accomplished by applying the uncoded video from the studio cameras and film chains to a video switch 10, which may comprise a pair of diodes alternately biased conductive and non-conductive or equivalent switching circuitry for directing the video signal to one of two outputs. One output of switch 10 is coupled to a delay line 11, which in accordance with current practice delays the video by approximately 1.675 $\mu$ sec, or the duration of six cycles at the color subcarrier frequency. The other output is coupled through an appropriate matching network to a combining network 12, wherein the undelayed video is combined with the delayed video prior to further amplification and processing in the transmitter.

Video switch 10, after introducing a delay of one line to accommodate a like delay in decoding the synchronizing bursts in the decoders, switches between its two output states in response to a rectangular switching signal, which is generated by a mode square wave generator 13. Contained within generator 13 is a multivibrator 14 having two alternate quiescent states, hereinafter referred to as B and C. The push-pull output of multivibrator 14 is coupled via a pair of conductors to video switch 10 wherein it controls the functioning of that device.

Multivibrator 14 is not free-running, but instead switches between its two states in response to external control pulses applied to its three inputs, hereinafter designated A, B and C. The A input constitutes a toggle input, and pulses applied to this input cause the multivibrator to change state regardless of its present state. The B and C inputs force the multivibrator to transition to like-designated states only if it is in the opposite state, otherwise no change occurs. To generate the rectangular switching signal, the output of a seven pulse counter 15 is coupled to input A. This counter counts horizontal pulses, and following the occurrence of every seventh horizontal pulse generates a control pulse which toggles the multivibrator. This in effect makes generator 13 free-running, changing the mode of video switch 10 every seven lines to form alternately delayed and undelayed seven-line-wide horizontal bands across the picture.

To introduce an element of randomness into the system, the phase of the rectangular switching signal is randomly shifted. This is accomplished by means of an inhibitable random pulse generator 16, which periodically generates in ten predetermined time slots in each vertical retrace interval a series of ten control effects each representative of a random one of seven possible counting states; six of these manifested in the form of a pulse on a respective one of six output terminals, and the seventh in the form of no output pulse at all. The six pulses are assigned certain functions, among them being the control of mode square wave generator 13. This assignment is accomplished by means of a program transposition matrix 17, which has the capability of coupling any of the six pulse outputs of generator 16 to any of five function circuits, to introduce an additional permutation level into the system for program identification and billing purposes. The five function circuits are arbitrarily designated A, B, C, D and E. A, B and C connect to their like-lettered inputs on multivibrator 14, and D and E connect to end-of-program and correlation control circuitry, respectively, in an inhibit logic circuit 18 which will be discussed later. In the encoder of FIG. 1, matrix 17 has been wired so that a 1 pulse from random pulse generator 16 toggles multivibrator 14 at its A input, a 3 pulse forces multivibrator 14 its C state, and a five pulse forces multivibrator 14 to its B state. Thus the possibility exists that the mode of generator 13 will be changed whenever one of these pulses is generated, depending on the state of multivibrator 14 at the time of generation.

In practice, multivibrator 14 is actually a two-stage circuit, comprising an input stage and an output or buffer stage. Pulses from generator 16 are applied to the input stage only during the ten time slots of the air code burst interval, i.e., the portion of the vertical retrace interval reserved for effecting phase changes in the rectangular switching signal. During each of these ten time slots the input stage of multivibrator 14, which may comprise a conventional J-K flip-flop, changes state in response to the occurrence of A, B, or C pulses from generator 16, finally assuming as a result of these pulses a B or C state at the end of each slot. The changes of state of the input stage are prevented from appearing at the output of multivibrator 14 by the buffer stage, which is gated to assume the state of the input flip-flop only during horizontal retrace intervals. This stage may take the form of a conventional J-K flip-flop having its J and K input terminals coupled to the Q and $\overline{Q}$ output terminals of the input flip-flop and its clock terminal coupled to a source of horizontal retrace pulses. With this arrangement the output of multivibrator 14 is changed only during horizontal retrace intervals to the state finally assumed by the input flip-flop at the end of the preceeding time slot.

Once the output state of multivibrator 14 has been thus determined, it remains in that state throughout the succeeding time slot, notwithstanding that its input stage may be responding to pulses from generator 16 towards determining the state for the next time slot. This process takes place ten times during each vertical retrace interval; corresponding to respective ones of the ten time slots of the air code burst interval.

Once the air code burst interval has ended, seven pulse counter 15 continues to toggle multivibrator 14 every seventh horizontal line to sustain the rectangular switching signal for the duration of the succeeding field. To insure that following the air code burst interval multivibrator 14 will run at whatever phase is established by the preceeding ten control effects from inhibitable random pulse generator 16, and not be returned to its previous phase by the first output from seven pulse counter 15, a reset of counter 15 is automatically accomplished following each C to B transition forced by the pulses from generator 16 during the air code burst interval. This is accomplished circuitwise by a capacitor 19 connected between the C output of multivibrator 14 and the reset input of seven pulse counter 15, which together with the internal impedance of the counter form a differentiating network for converting C to B transitions to suitable reset pulses.

Figure 2:
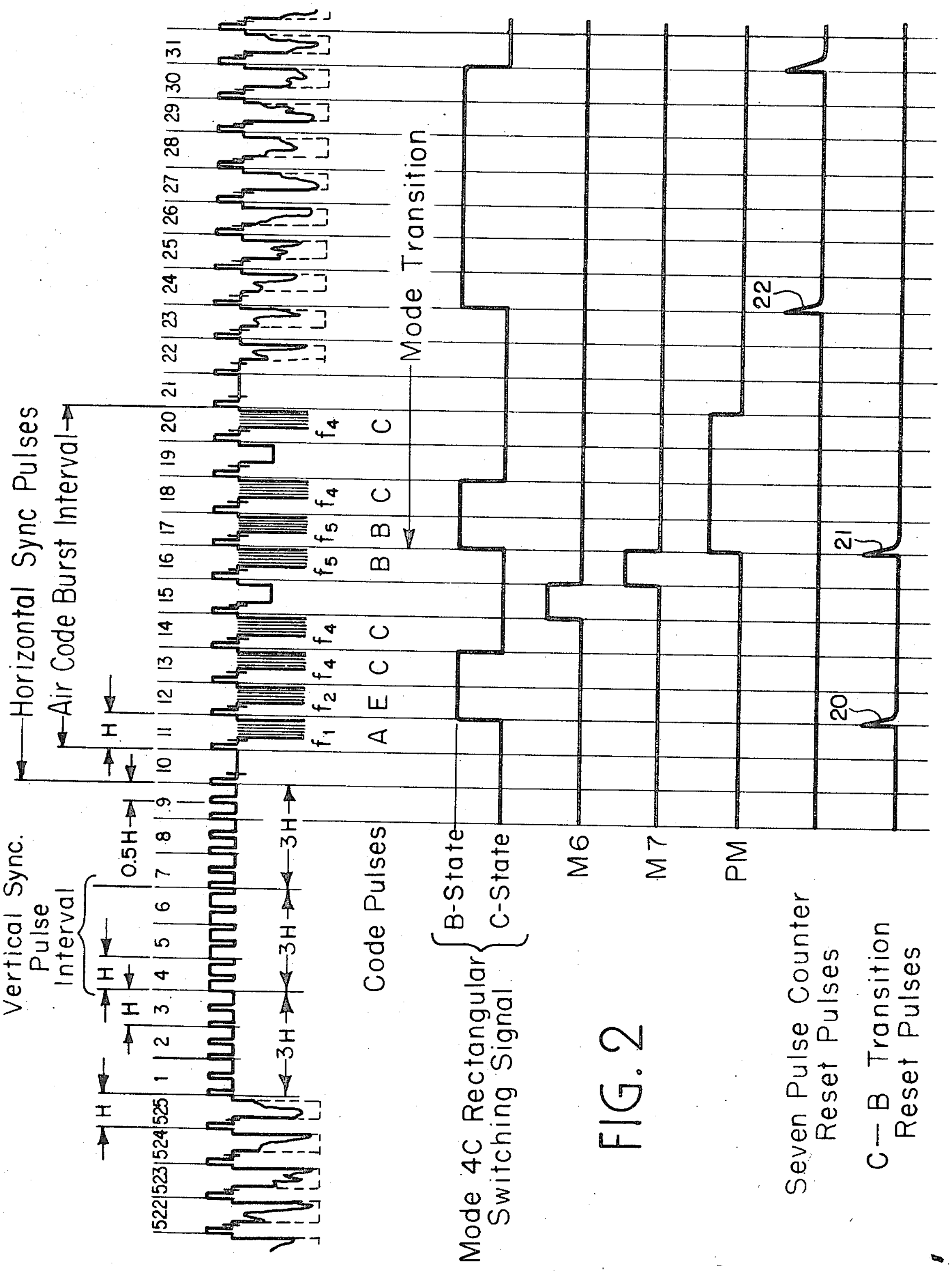
FIG. 2 is a graphical representation of signal waveforms useful in understanding the operation of the encoder of FIG. 1.

The final phase of the rectangular switching signal depends only on the final C to B transition, or phase transition point, since it is only that transition which resets the seven pulse counter to establish a new free-running phase. This can better be seen in FIG. 2, which is a timing chart of various encoder signals during the phase change portion of a vertical retrace interval. The vertical interval is seen to comprise 24 timing slots, each one a single horizontl line in duration and consecutively numbered 1 through 24. The air code burst interval occupies slots 11 through 20 inclusive, and it is during these ten slots that the phase-determining pulses are generated. For purposes of explanation we will assume that generator 16 produced the illustrated series of pulses during this interval; namely AECCOBBCOC, with 0 indicating the absence of a pulse.

The phase of the rectangular switching signal has come to be designated as a mode identified with a single numeral and a single letter; the numeral specifying the number of time slots the phase (or mode) transition point (or last reset of the seven pulse counter) precedes the end of the air code burst interval, and the letter indicating the instantaneous state (B or C) of the rectangular switching signal at the end of the air code burst interval. Since seven pulse counter 15 toggles multivibrator 14 every seven lines, the rectangular switching signal has a period of 14 lines or time slots, and hence 14 possible modes; 1B–7B and 1C–7C. Reference is now made to the mode 4C waveform of FIG. 2, which was generated by the aforementioned series of pulses in a manner now to be described. The A pulse generated by generator 16 in time slot 11 toggled multivibrator 14, forcing the rectangular switching signal to transition from its C to B state between slots 11 and 12 producing a reset pulse 20 for seven pulse counter 15. The correlation E pulse in slot 12 caused no change, and the C pulse in slot 13 forced a B to C transition between slots 13 and 14. The C pulse in slot 14 caused no change, since the rectangular switching signal was already in the C state. There was no pulse in slot 15, and hence no change. The B pulse in slot 16 forced a C to B transition between slots 16 and 17, the mode transition point for mode 4C operation, producing a reset pulse 21 which again reset seven pulse counter 15. The B pulse in slot 17 produced no change, and the C pulse in slot 18 forced a B to C transition. The absence of a pulse in slot 19 and the C pulse in slot 20 produced no change, leaving the rectangular switching signal in a C state at the end of the air code burst interval and seven pulse counter 15 with a 4 count as required by mode 4C. The switching signal remained in a C state until three time slots later, when seven pulse counter 15 reached a seven count and produced an output pulse 22 which toggled multivibrator 14 to its B mode. For the balance of the vertical scanning cycle counter 15 periodically toggled multivibrator 14 every seven horizontal lines, thus maintaining the rectangular switching signal in the 4C mode during the successive field and at least until the next vertical retrace interval.

In order for the decoder to decode the encoded signal at the subscriber's receiver it is necessary that the decoder locally reconstruct the rectangular switching signal at the same frequency and phase that it was generated at by multivibrator 14. To this end each of the output terminals 1–6 of random pulse generator 16 is connected to an assigned one of six gated discrete-burst-frequency oscillators in an air code burst generator 23. These six oscillators each have gated input stages, in the form of conventional J–K flip-flops the input terminals of which are coupled to respective ones of output terminals 1-6 of random pulse generator 16, and the clock control terminals of which are coupled to a source of horizontal retrace pulses. Thus connected, the input flip-flops perform in a manner similar to multivibrator 14, recognizing only the final output state of generator 16 as it exists upon the occurrence of the horizontal retrace interval following a horizontal scanning interval time slot.

Since it is possible for one and only one output pulse to be generated at one time by generator 16, it is possible for only one of the six input flip-flops to assume a transfer state during a particular retrace interval. Furthermore, once an input flip-flop has assumed its transfer state, it will remain in that state until the next horizontal retrace interval clock pulse, at which time it will return to its quiescent state if generator 16 has assumed a different output state.

While the input flip-flop is in its transfer state, conventional gated oscillator circuitry produces a discrete-frequency burst signal in the range of 500–1000 kHz. This burst, necessarily of at least one time slot in duration, is combined with the composite video signal in combiner network 12 prior to transmission to the decoders. Thus, for each output pulse generated by generator 16, a burst signal is transmitted in the following time slot at a discrete frequency indicative of the particular generator output terminal the pulse appeared on. In all, ten such bursts may be transmitted for each air code burst interval, one in each of the ten reserved time slots. Only when generator 16 generates a 0 or no output control effect will no burst be produced. In the decoder frequency selective detectors convert the bursts back into code pulses on six respective terminals from which the rectangular switching signal is reconstructed in a manner complementary to the generation process just described.

In practice, it is not desirable to leave the rectangular switching signal mode selection purely to the haphazard appearance of ten pulses, since that would involve the likelihood of a mode change with every field. Instead, the encoder includes circuitry which inhibits the operation of the random pulse generator to the extent necessary to force a particular switching signal mode. For instance, assuming that it is desired to continue to operate with a rectangular switching signal of the 4C mode as in FIG. 2, it is necessary to reset the seven pulse counter at the mode transition point between time slots 16 and 17. In order for this to occur, the rectangular switching signal must transition from a C state in time slot 16 to a B state in time slot 17 to obtain a C to B transition. Since the pulse generator is normally completely random, the only way to insure this transition is to inhibit the generator from producing certain output pulses which would not force the required transition. Specifically, during time slot 15 A and B pulses are inhibited since these would prevent the necessary C state in time slot 16. In time slot 16 the rectangular switching signal must transition to the B state, so C, D, E and 0 pulses are inhibited. Once the transition has taken place it is necessary to insure that a C state will exist in time slot 20, so A and B are inhibited, the only two outputs which would if generated change the already existing C state to a B state.

It must be understood that in inhibiting a particular output pulse from random pulse generator 16, the inhibited output state is actually removed from the random selection and the chances for one of the other states being selected are improved. This makes it possible to force a particular output pulse by inhibiting all other states from consideration.

While the mode of the rectangular switching signal could be set manually by means of a pair of switches designating the numeric portion 1–7 and the terminal state B/C of the mode, it is preferable for security reasons to randomly select a new mode at random intervals during normal operation of the system. To this end the encoder includes a mode change control circuit 24 which produces a control signal at random intervals for initiating a change in the rectangular switching signal mode. The control signal is applied to one input of an AND gate and serves as an enabling signal for that device. When and only when control circuit 24 calls for a mode change, a random selection of a new mode is accomplished by feeding random noise pulses from a noise generator 25 through an AND gate 26 and into a seven-position mode select counter 27 and a two-position B/C mode select counter 28 for a predetermined period of time. When the counting period has ended, the seven-position counter will unpredictably occupy one of its seven states, thus randomly designating the numeric portion of the new operating mode. Similarly, the two stage counter will occupy one of its two states, thus randomly designating whether the new mode will be a B mode or a C mode.

The 1–7 numeric selection of the counter appears as a single enabling signal at a respective one of seven output terminals. These terminals are in turn connected to respective ones of seven NAND gates 29–35, the other inputs of the gates being connected to sources of timing pulses occurring three time slots prior to the particular time slot in which the mode associated with the particular seven position counter output calls for a mode change. For example, should the counters call for a mode 4C rectangular switching signal, the 4 output terminal only of counter 27 would be high, enabling only NAND gate 32. The other input of gate 32 is connected to a source of timing pulses coinciding with time slot 14, henceforth designated TP14. The outputs of gates 29–35 are connected together to form a common output consisting of a single pulse MN three time slots prior to the mode change point. The MN pulse, in this case TP14, is applied to an inhibit logic control circuit 36, which responds to the MN pulse by generating an M6 control pulse three time slots prior to the mode change, an M7 control pulse two time slots prior to the mode change, and a post-mode or PM control pulse between one time slot prior to the mode change and the end of the air code burst interval. These assignments take into account the one-line delays introduced by multivibrator 14 and air code burst generator 23. In our example M6 would coincide with slot 14, M7 with slot 15, and MN with slots 16–20, inclusive. These three control pulses, together with the output of the B/C counter, are applied to inhibit logic circuits 18 and utilized therein to set up the necessary function inhibit signals preceeding and following the mode change.

In determining which functions are to be inhibited, logic circuits 18 take into account the desired mode via the M6, M7, PM and B/C counter output signals, the present state of the rectangular switching signal via the B and C outputs of multivibrator 14, and the prior occurrence of D and E pulses to determine whether a correlation or end of program pulse can or should be transmitted during a particular air code burst interval. The output of logic circuits 18 is in the form of inhibit pulses for the various functions, namely $\overline{A}$, $\overline{B}$, $\overline{C}$, $\overline{D}$, $\overline{E}$ and $\overline{0}$. With the exception of the $\overline{0}$ signal, which is coupled directly, these function inhibit signals become inhibit signals for the six possible output states 1–6 of random pulse generator 16 by means of a second program transposition matrix 37, which couples the function inhibit signals to appropriate inhibit inputs $\overline{1}$ – $\overline{6}$ of generator 16 with the same permutations provided by matrix 17. Thus, when inhibit logic circuit 18 calls for no B to be transmitted during a particular one of the ten air code burst interval time slots, it outputs a $\overline{B}$ signal which becomes a $\overline{5}$ signal and prevents random pulse generator 16 from generating a 5 pulse during that time slot.

Figure 3:
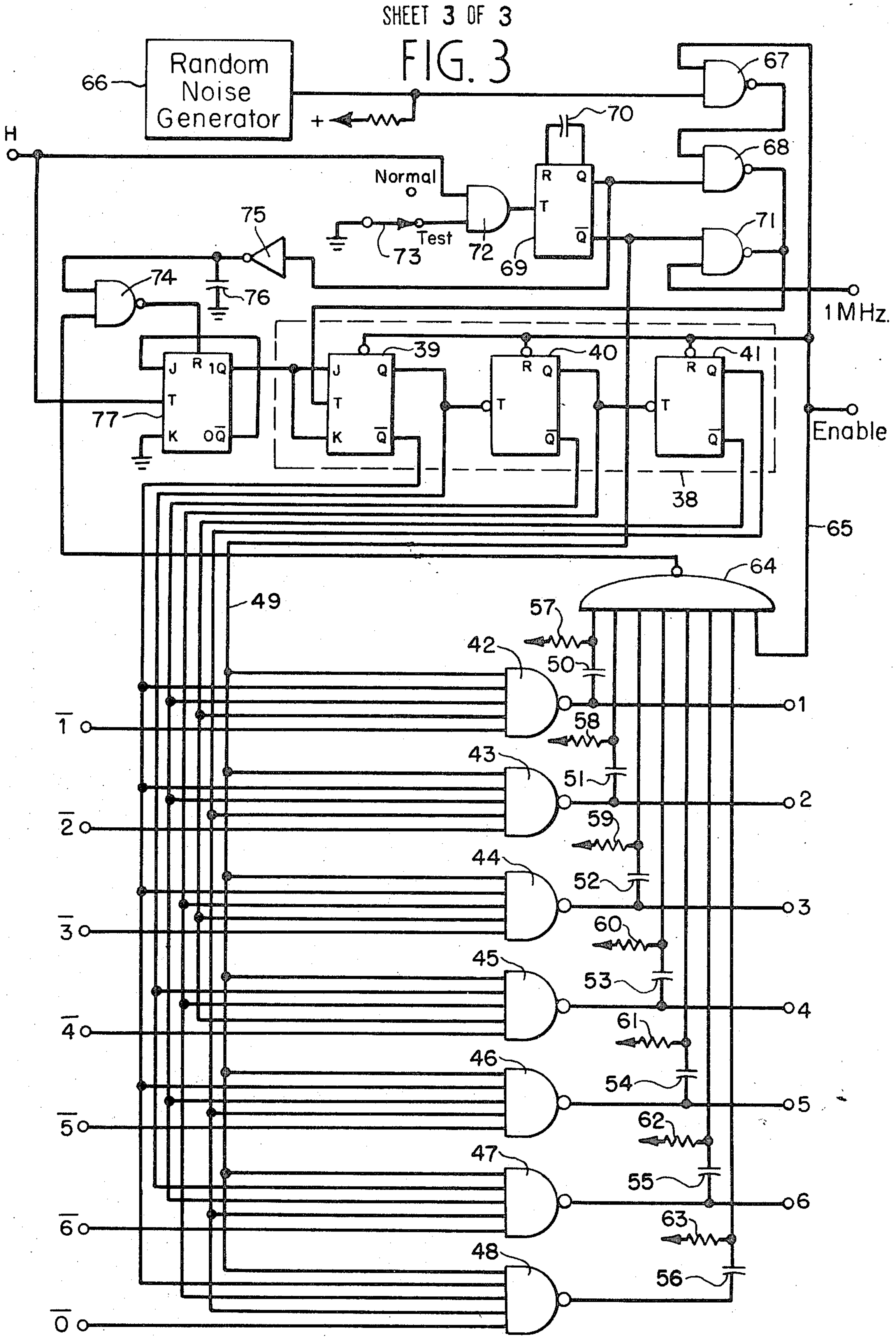
FIG. 3 is a schematic diagram, partially in block diagram form, of an inhibitable random pulse generator constructed in accordance with the invention.

Having considered the operation of the encoder as a system, we are now in a position to consider in detail the novel circuitry of inhibitable random pulse generator 16, which is shown in FIG. 3 and to which the present invention is directed. Referring to FIG. 3, there exists in generator 16 a three-stage binary counter 38 comprising conventional J-K flip-flops 39, 40 and 41 and associated interconnecting circuitry for counting from a reset position up to seven in response to applied input pulses. The Q and $\overline{Q}$ outputs of each counter are connected to a decoding network comprising seven logical NAND gates 42–48, each NAND gate producing a control effect in the form of a change in its output voltage level when the counter is in an assigned respective one of the seven non-reset counting states. The NAND gates each have five inputs, three of which are connected to Q and $\overline{Q}$ outputs of appropriate ones of the flip-flops in a pattern well known to the art. The fourth input of each gate is connected to a respective one of inhibit input terminals $\overline{1}$ – $\overline{6}$ and $\overline{0}$, which accept like-designated inhibit input signals from matrix 37. When one of these inputs is held low, as with a control signal from logic control circuits 18, the associated NAND gate is inhibited and the counter can produce no output in that particular counting state. The remaining input of each gate is connected to an internal control line 49 which disables the gates during a portion of the pulse generation cycle in a manner which will be covered later. The outputs of NAND gates 42–47 are connected to a respective one of the output terminals 1–6. Thus, when counter 38 occupies a particular 1–7 counting state, the output terminal corresponding to that state is held low. There is no output from NAND gate 48 since the seventh count is considered a 0 or no output condition.

Associated with each NAND gate output is an R–C differentiating network in the form of a capacitor and resistor series connected to a unidirectional current source. Specifically, respective ones of capacitors 50–56 and resistors 57–63 are series-connected between the outputs of respective ones of NAND gates 42–48 and a source of positive unidirectional current. The juncture of each of these seven R–C pairs is connected to an assigned one of 8 inputs of a logical NAND gate 64, the eighth input being connected to a control line 65 which will be discussed later. These R–C differentiating networks function in a manner well-known to the art to produce at their junctures a negative pulse in response to the leading edge of an output pulse appearing at their associated NAND gate. Any such negative pulse applied to one of the inputs of NAND gate 64 produced a positive control pulse at the output of that gate.

During each operating cycle of the random pulse generator the three stage counter 38 is normally first advanced to an unpredictable random counting state by applying noise for a predetermined period of time. To this end a random noise generator 66 is provided and coupled by means of logical NAND gates 67 and 68 to the toggle input of flip-flop 39, the first or input flip-flop of counter 38. Noise generator 66 is entirely conventional in design, and may comprise one of several circuits well-known to the art for this purpose.

The noise signal from noise generator 66 is applied to one input of a gate 67, the other input of which is connected to generator control line 65. The output of gate 67 is coupled to one input of gate 68, the other input of which is connected to the Q output of a multivibrator 69. This multivibrator is a monostable type, and upon application of a pulse to its toggle input it changes for a predetermined period of time from its quiescent state in which Q is low and $\overline{Q}$ is high, to its transient state in which $\overline{Q}$ is low and Q is high. The duration of the switch-over is dependent on the internal characteristics of the multivibrator, and may be modified by provision of an external capacitor 70 or other components connected across appropriate terminals. In practice a switch-over duration of approximately one-half horizontal line period, or approximately 32 $\mu$ sec, has been found satisfactory.

The $\overline{Q}$ output of multivibrator 69 is connected to one input of another logical NAND gate 71, the other input of which is connected to a source of 1 MHz stepping pulses. The outputs of gates 68 and 71 are connected together and then to the toggle input of the input flip-flop 39 of counter 38. With this arrangement counter 38 is supplied with random pulses from generator 66 when Q is high and gate 68 is enabled, or with a 1 MHz stepping signal when $\overline{Q}$ is high and gate 71 is enabled. The $\overline{Q}$ output of multivibrator 69 is also connected to control line 49, which serves to inhibit NAND gates 42–48 when the multivibrator is in its transient state and $\overline{Q}$ is low.

In operation, multivibrator 69 is toggled to its transient state at the beginning of each operating cycle of the pulse generator by applying a horizontal pulse to its toggle input. This is done by means serially including a logical AND gate 72, which together with an operating mode selection switch 73 prevents pulses from being applied during certain test operating modes in which randomization of the counter is not desired. As we have seen, once toggled, multivibrator 69 remains in its transient state for a predetermined period of time, in the order of one-half horizontal line, after which it automatically returns to its quiescent state. During the period of time multivibrator 69 is in its transient state, gate 68 is enabled and noise pulses are applied to counter 38, so that when the time period ends counter 38 occupies an unpredictable one of its seven possible counting states. NAND gates 42–48 are disabled by control line 49 during this period, to prevent any output from the generator and possible interference with the random stepping of counter 38.

After flip-flop 69 returns to its quiescent state, gates 42–48 and gate 71 are enabled and the 1 MHz stepping signal is applied to the counter. This signal rapidly steps the counter through its counting states until it reaches a first uninhibited counting state; at which time the output gate associated with that state produces an output. This output is differentiated by the associated R–C network and applied as a pulse to gate 64, wherein a positive polarity output pulse is produced. This pulse is applied to one input of a logical NAND gate 74, the other input of which is connected to the output of an inverter 75, and to ground by a roll-off capacitor 76. The input of inverter 75 is connected to the Q or noise-enable output of flip-flop 69, and inverts this output prior to its application to gate 74. Capacitor 76 provides a slight delay at the leading edge of the output from multivibrator 69 to prevent any possibility of overlap between the first and second portions of the pulse generation cycle.

The delayed pulse constitutes an enabling pulse for gate 74, allowing the output pulse from gate 64 to be applied to the reset input of a counter-control flip-flop 77 after multi-vibrator 69 has returned to its quiescent step-enable state. Flip-flop 77, which may be of the familiar J-K type, has positive polarity horizontal pulses applied to its toggle input. By virtue of its K input being grounded and its $\overline{Q}$ output being connected to its J input, these horizontal pulses establish flip-flop 77 in a state wherein Q is high and $\overline{Q}$ low at the beginning of each operating cycle. The Q output of flip-flop 77 is connected to the J and K inputs of flip-flop 39, the input flip-flop of counter 38. Thus, when Q is high, as at the beginning of the operating cycle, the inputs of flip-flop 39 are both high, and flip-flop 39 is conditioned for normal toggling action by negative noise and step pulses from NAND gates 68 and 71. However, upon the occurrence of a reset pulse from gate 74, as when the counter is stepped to its first non-inhibited state, flip-flop 77 is reset to a state wherein Q is low and $\overline{Q}$ high; causing both inputs of flip-flop 39 to be low and counter 38 to be effectively disabled. Thus, the first output pulse occurring while the counter is being stepped in the second portion of its operating cycle terminates the count.

The counter remains in its terminal counting state producing a negative-polarity output on one of its output terminals 1–6 until the next-occurring horizontal retrace period, at which time a horizontal retrace pulse triggers multivibrator 69 and toggles flip-flop 77 to begin the code pulse generation cycle anew.

To prevent the random pulse generator from operating outside of the air code burst interval, control line 65 is provided. This line runs to assigned inputs on NAND gates 64 and 67, and to the reset inputs of flip-flops 39–41. Control line 65 is high between TP9 and TP20, and low at all other times, therefore serving to enable its associated units only during the interval in which the air code can e transmitted and random code pulses are required. This is highly desirable to minimize interference with the picture and other components of the composite video signal.

To facilitate testing and repair of the system decoders it is desirable that the generator provide for the transmission of a regular repetitive series of pulses. To this end operating mode selection switch 73 is provided to disable gate 72, and hence multivibrator 69, during test mode operation. With the multivibrator thus disabled, the 1 MHz stepping pulses, and not noise pulses, are applied to counter 38 at the beginning of each cycle. This allows the stepping pulses to generate for each operating cycle a regular repetitive series of generator output pulses, since counting begins from a predictable rather than a random counting state.

For example, in a so-called fixed frequency mode it is desired to fill the ten time slots of the air code burst interval with pulses 1–2–3–4–5–6–1–2–3–4. This is accomplished by merely inhibiting 0 with $\overline{0}$ input and placing switch 73 in the test position. Counting begins in the first time slot with counter 38 in the reset position by virtue of that counter having been reset by control line 65. The first stepping pulse advances the counter to a 1 count, which is not inhibited and therefore produces an output at terminal 1. Differentiating network 50, 57 therefore produces a pulse, which in turn activates gates 64 and 74 and flip-flop 77. This disables counter 38, which remains in the one count condition for the remainder of that first time slot. In the next time slot counting begins with counter 38 in a 1 count condition, and counting is terminated when it reaches a 2 count condition. Thus the desired 1–2–3–4–5–6 output pulses are produced. The balance of the series, 1–2–3–4, is produced in the same manner, since in the seventh time slot counting is not stopped when the counter steps through the inhibited 0 state and the reset state, for which not output is provided.

Other test operating modes are possible, including a so-called fixed mode wherein a desired air code is switch selected and the generator produces a repetitive series of pulses which accommodate that mode by producing the rectangular switching signal at the desired phase. This is also accomplished with switch 73 in the test position, except that in this case inhibit logic circuit 18 is permitted to apply the necessary inhibit signals to the generator. Since control line 65 resets counter 38 at the beginning of each air code burst interval, and the logic inhibitions are necessarily the same for successive burst intervals, it follows that a resular recurrent series of output pulses will be produced.

Thus, a novel inhibitable random pulse generator has been shown and described which operates in the manner of an electronic "roulette wheel", providing one of seven possible output conditions for each activation. The circuit functions with a novel two-step cycle; first applying noise impulses to achieve a random initial state for the counter, and then applying step pulses to obtain a proper uninhibited output pulse. Furthermore, the counter contains circuitry which disables the random selection process to accomplish certain test functions to facilitate testing and repair of the encoder and associated decoders. The circuitry employed is unique and economical to construct, and makes maximum use of solid-state flip-flop states and other packaged logic elements for greater reliability, lower cost, and lower space requirements. Moreover, it must be appreciated that while the circuit has been shown in the embodiment of a subscription television system, it would be applicable to other uses were an inhibited source of random pulses is required.

While the particular embodiment of the invention has been shown and described, it will be obvious to those skilled in the art that changes and modifications may be made without departing from the invention in its broader aspects, and, therefore, the aim of the appended claims is to cover all such changes and modifications.

We claim:

1. An inhibitable random pulse generator for use in a subscription television system or the like, comprising:
   - an electric counter responsive to an applied signal for cyclically stepping through a series of predetermined counting states;
   - a source of random noise pulses;
   - means for applying said noise pulses to said counter for a predetermined period of time to step said counter to a random unpredictable one of said counting states;
   - means for inhibiting selected ones of said states;
   - a source of stepping pulses; and
   - means for applying said stepping pulses to said counter to step said counter to the first non-inhibited one of said series of counting states.

2. An inhibitable random pulse generator as described in claim 1 wherein said counter includes means for generating respective control effects for each of said counting states, and means for translating said control effects to a common output terminal;
   - said inhibiting means inhibits the translation of said control effects for said selected ones of said states; and
   - said stepping means includes means for preventing further stepping of said counter upon the translation of one of said control effects to said common output terminal.

3. An inhibitable random pulse generator as described in claim 2 wherein said control effects comprise control signals, said inhibiting means comprise electric switching means associated with respective ones of said generating means, and said means for preventing further stepping of said counter are responsive to said control signal.

4. An inhibitable random pulse generator as described in claim 3 wherein said counter is a multistage binary counter and said disabling means comprise means for disabling the input stage of said counter.

5. An inhibitable random pulse generator as described in claim 1 wherein said means for applying said noise pulses comprises a first gate element open only during said first predetermined period; and
   - wherein said source of stepping pulses is coupled to said counter by a second gate element open only during a second predetermined period not overlapping said first predetermined period.

6. An inhibitable random pulse generator as described in claim 5 wherein switching means are further included for alternately rendering either said first gate or said second gate conductive.

7. An inhibitable random pulse generator as described in claim 6 wherein said switching means comprise a multivibrator responsive to an externally applied control signal.

8. An inhibitable random pulse generator as described in claim 7 wherein said control signal occurs immediately prior to said first predetermined time period.

9. An inhibitable random pulse generator as described in claim 8 wherein said control signal returns said counter to a predetermined counting state prior to said first predetermined time period.

10. An inhibitable random pulse generator as described in claim 7 wherein said multivibrator is a monostable device having a switching rate corresponding to said first predetermined period and said control signal is a horizontal retrace pulse.

11. An inhibitable random pulse generator as described in claim 7 wherein said control signal re-occurs at intervals substantially corresponding to the sum of said first and second predetermined time periods.

12. An inhibitable random pulse generator as described in claim 1 wherein is further provided means for selectively preventing the application of noise pulses to said counter during said first predetermined period of time to cause said counter to cyclically assume all of said non-inhibited counting states.

* * * * *